United States Patent
Jano

(10) Patent No.: US 8,638,917 B2
(45) Date of Patent: Jan. 28, 2014

(54) METHOD AND APPARATUS FOR COORDINATING ANSWERED CALL STATUS

(75) Inventor: Bashar Jano, Algonquin, IL (US)

(73) Assignee: BlackBerry Limited, Waterloo (CA)

( * ) Notice: Subject to any disclaimer, the term of this patent is extended or adjusted under 35 U.S.C. 154(b) by 12 days.

(21) Appl. No.: 13/336,419

(22) Filed: Dec. 23, 2011

(65) Prior Publication Data

US 2013/0163738 A1    Jun. 27, 2013

(51) Int. Cl.
*H04M 3/42* (2006.01)

(52) U.S. Cl.
USPC ............. 379/201.02; 379/201.01; 379/211.04

(58) Field of Classification Search
USPC .......................... 379/201.02, 201.01, 211.04
See application file for complete search history.

(56) References Cited

U.S. PATENT DOCUMENTS

| | | | |
|---|---|---|---|
| 5,027,341 A | 6/1991 | Jarvis | |
| 5,963,864 A * | 10/1999 | O'Neil et al. | 455/445 |
| 6,721,412 B1 | 4/2004 | Youngs | |
| 2002/0133405 A1 | 9/2002 | Newnam et al. | |
| 2005/0058067 A1 | 3/2005 | Chmayatelli et al. | |
| 2005/0221809 A1 * | 10/2005 | Lin | 455/418 |
| 2006/0058049 A1 | 3/2006 | McLaughlin | |
| 2011/0026517 A1 | 2/2011 | Capuozzo et al. | |

OTHER PUBLICATIONS

Extended European Search report mailed Jun. 4, 2012, in corresponding European patent application No. 11195548.0.

* cited by examiner

*Primary Examiner* — Quynh Nguyen

(74) *Attorney, Agent, or Firm* — Novak Druce Connolly Bove + Quigg LLP

(57) ABSTRACT

A method, system and apparatus for coordinating call status are provided. When a call directed to both a first communication device and a second communication device was answered at the first communication device, the second communication device is notified that the call was answered, such that the second communication device records a status of the call as answered.

20 Claims, 19 Drawing Sheets

Prior Art 415-555-1212 Received at 12:38, Oct. 31 2011
Unanswered  1111A

Fig. 11A 415-555-1212 Received at 12:38, Oct. 31 2011
Answered  1111B

Fig. 11B 415-555-1212 Received at 12:38, Oct. 31 2011
Answered at Your Mobile Device 1111C

Fig. 11C 415-555-1212 Received at 12:38, Oct. 31 2011
Call Ended at 1:02  1111D

Fig. 11D 415-555-1212 Received at 12:38, Oct. 31 2011
Call Length 24 Minutes  1111E

Fig. 11E 415-555-1212 Received at 12:38, Oct. 31 2011
Answered at Your Mobile Device
Call Length 24 Minutes  1111F

Fig. 11F

METHOD AND APPARATUS FOR COORDINATING ANSWERED CALL STATUS

FIELD

The specification relates generally to a communication device, and specifically to a method, system and apparatus for coordinating answered call status.

BACKGROUND

The evolution of computers is currently quite active in the communication device environment. It is now well-known to include calendaring, contacts, and messaging functions in communication devices. More recently, there has been a veritable explosion of the number and type of applications that are configured to the unique form factors and computing environments of communication devices.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 11A depicts a GUI (Graphic User Interfaces) for indicating a status of a call as unanswered, according to the prior art.

FIGS. 11B-11F depict GUIs for indicating a status of a call as answered, according to non-limiting implementations.

DETAILED DESCRIPTION

Figure 1:
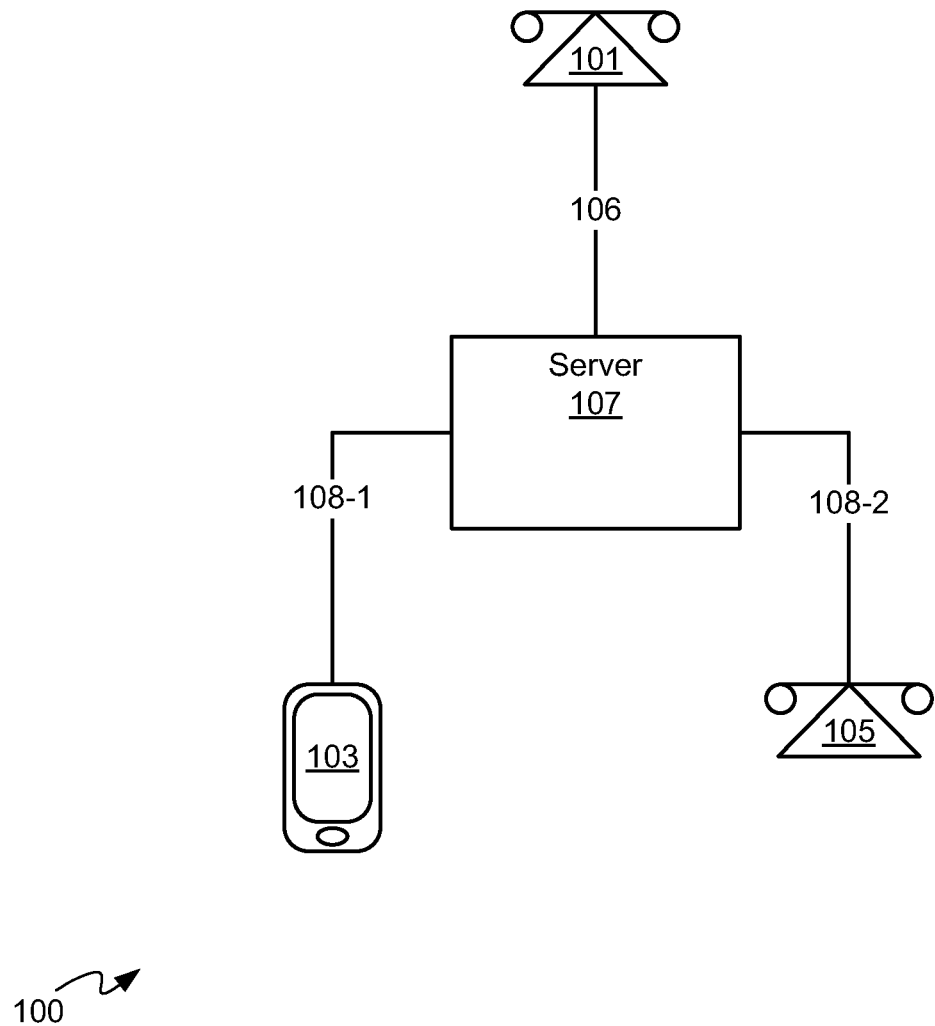
FIG. 1 depicts a system for coordinating answered call status, according to non-limiting implementations.

An aspect of the specification provides an apparatus comprising: a processor coupled to a communication interface, the processor enabled to: when a call directed to both a first communication device and a second communication device was answered at the first communication device: notify, via the communication interface, the second communication device that the call was answered, such that the second communication device records a status of the call as answered.

The apparatus can further comprise a server enabled to direct the call to both the first communication device and the second communication device, the server can comprise the processor and the communication interface. The processor can be further enabled to determine that the call was answered at the first communication device by one or more of: monitoring the call; and, receiving call status data from the first communication device, the call status data indicative that the call was answered. The processor can be further enabled to request call status data from the first communication device in response to receipt of a call status request by the second communication device.

The processor can be further enabled to notify the second communication device that the call was answered at the first communication device in response to receipt of a call status request by the second communication device.

The apparatus can further comprise the first communication device, the first communication device can comprise the processor and the communication interface. The processor can be further enabled to transmit a notification of call status to the second communication device via a communication link different from a call communication link, wherein the call is received via the call communication link. The processor can be further enabled to notify the second communication device that the call was answered in response to receipt of a call status request sent by the second communication device.

The second communication device can be notified that the call was answered regardless of whether the call was received at the second communication device.

Another aspect of the specification provides a method comprising: when a call directed to both a first communication device and a second communication device was answered at the first communication device: notifying the second communication device that the call was answered, such that the second communication device records a status of the call as answered. The method can occur at one or more of a server and the first communication device.

The method can further comprise determining that the call was answered at the first communication device by one or more of: monitoring the call at a server; and, receiving call status data at the server from the first communication device, the call status data indicative that the call was answered. The method can further comprise the server requesting call status data from the first communication device in response to receipt of a call status request from the second communication device.

Notifying the second communication device that the call was answered at the first communication device can occur in response to receipt of a call status request sent by the second communication device.

A notification of call status can be transmitted to the second communication device via a communication link different from a call communication link, wherein the call is received via the call communication link.

The second communication device can be notified that the call was answered regardless of whether the call was received at the second communication device.

A further aspect of the specification provides a computer program product comprising a computer usable medium having a computer readable program code adapted to be executed to implement a method comprising: determining that a call directed to both a first communication device and a second communication device was answered at the first communication device, the determining occurring at one or more of a server and the first communication device; and, notifying the second communication device that the call was answered, such that the second communication device records a status of the call as answered, the notifying occurring via one or more of the server and the first communication device. The computer program product can comprise a non-transitory computer program product.

Yet a further aspect of the specification provides a communication device comprising: a processor coupled to a communication interface, the processor enabled to: receive, via the communication interface, a call that is also directed to a remote communication device; determine that the call is unanswered at the communication device; receive a notification, via the communication interface, that the remote communication device answered the call; and, record a status of the call as answered.

The notification can be received in response to requesting the status of the call from at least one of the remote communication device and a server associated with the call.

The status of the call can be first recorded as unanswered, and the processor can be further enabled to record the status of the call as answered by changing a recorded status of the call from unanswered to answered after receiving the notification.

Yet another aspect of the specification provides a method comprising: receiving, at a processor of a communication device, via a communication interface of the communication device, a call that is also directed to a remote communication device; determining, at the processor, that the call is unanswered at the communication device; receiving a notification, via the communication interface, that the remote communication device answered the call; and, recording, via the processor, a status of the call as answered at a memory.

Yet another aspect of the specification provides a computer program product comprising a computer usable medium having a computer readable program code adapted to be executed to implement a method comprising: receiving, at a processor of a communication device, via a communication interface of the communication device, a call that is also directed to a remote communication device; determining, at the processor, that the call is unanswered at the communication device; receiving a notification, via the communication interface, that the remote communication device answered the call; and, recording, via the processor, a status of the call as answered at a memory. The computer program product can comprise a non-transitory computer program product.

FIG. 1 depicts a system 100 for coordinating answered call status comprising a communication device 101 enabled to communicate with at least two communication devices 103, 105 via link 106, a server 107, and links 108-1, 108-2 according to non-limiting implementations. Communication device 101 will be also referred to hereafter as device 101. This convention will be used elsewhere in the present specification. Furthermore, links 108-1, 108-2 will also be referred to hereafter generically as a link 108, and collectively as links 108. This convention will be used in the present specification. It is further appreciated that server 107 is enabled to fork calls to devices 103, 105 such that device 101 calls one of devices 103, 105 and yet server 107 notifies both of devices 103, 105 of the incoming call such that both devices 103, 105 provide notifications of the call. In other words, device 101 calls one of devices 103, 105 and both of the devices 103, 105 "ring".

Hence, server 107 is generally enabled to establish a session involving two or more terminal devices. In the prior art, it is appreciated that when one of the two terminal devices answer the call, the terminal device(s) that do not answer the call detects a failed session establishment: in other words, the terminal device(s) that do not answer the call records the call as being unanswered.

System 100, however, does not suffer from such a problem. Rather, as will presently be explained, the device 103, 105 that does not answer the call, is notified that the call was answered, such that the device 103, 105 that does not answer the call records a status of the call as answered.

Device 101 can be any type of electronic device that can be used in a self-contained manner to make calls, for example voice calls, to devices 103, 105. It is hence appreciated that device 101 comprises any suitable communication device for communicating with devices 103, 105 including but not limited to any suitable combination of computing devices, personal computers, laptop computers, portable electronic devices, mobile computing device, portable computing devices, tablet computing devices, laptop computing devices, desktop phones, telephones, PDAs (personal digital assistants), cellphones, smartphones and the like. Other suitable communication devices are within the scope of present implementations.

Device 103 can be any type of electronic device that can be used in a self-contained manner to interact with a communications network, including server 107, via link 108-1. It is hence appreciated that device 101 comprises any suitable communication device for communicating with server 107 and, in some implementations, device 105. Device 103 includes, but is not limited to, any suitable combination of computing devices, personal computers, laptop computers, portable electronic devices, mobile computing device, portable computing devices, tablet computing devices, laptop computing devices, desktop phones, telephones, PDAs (personal digital assistants), cellphones, smartphones and the like. Other suitable communication devices are within the scope of present implementations.

Device 105 can be similar to or different from device 103 and can include, but is not limited to, any suitable combination of computing devices, personal computers, laptop computers, portable electronic devices, mobile computing device, portable computing devices, tablet computing devices, laptop computing devices, PDAs (personal digital assistants), cellphones, smartphones and the like. Other suitable communication devices are within the scope of present implementations. Further, while two devices 103, 105 are depicted in FIG. 1, it is appreciated that system 100 can comprise any suitable number of communication devices to which calls can be forked. While the term "fork" is used throughout the specification to indicate that a call to one of devices 103, 105 can be retrieved at either of devices 103, 105, it is appreciated that such behaviour can also be referred to as twinning.

Each link 106, 108 comprises any suitable link with server 107, including any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

Figure 2:
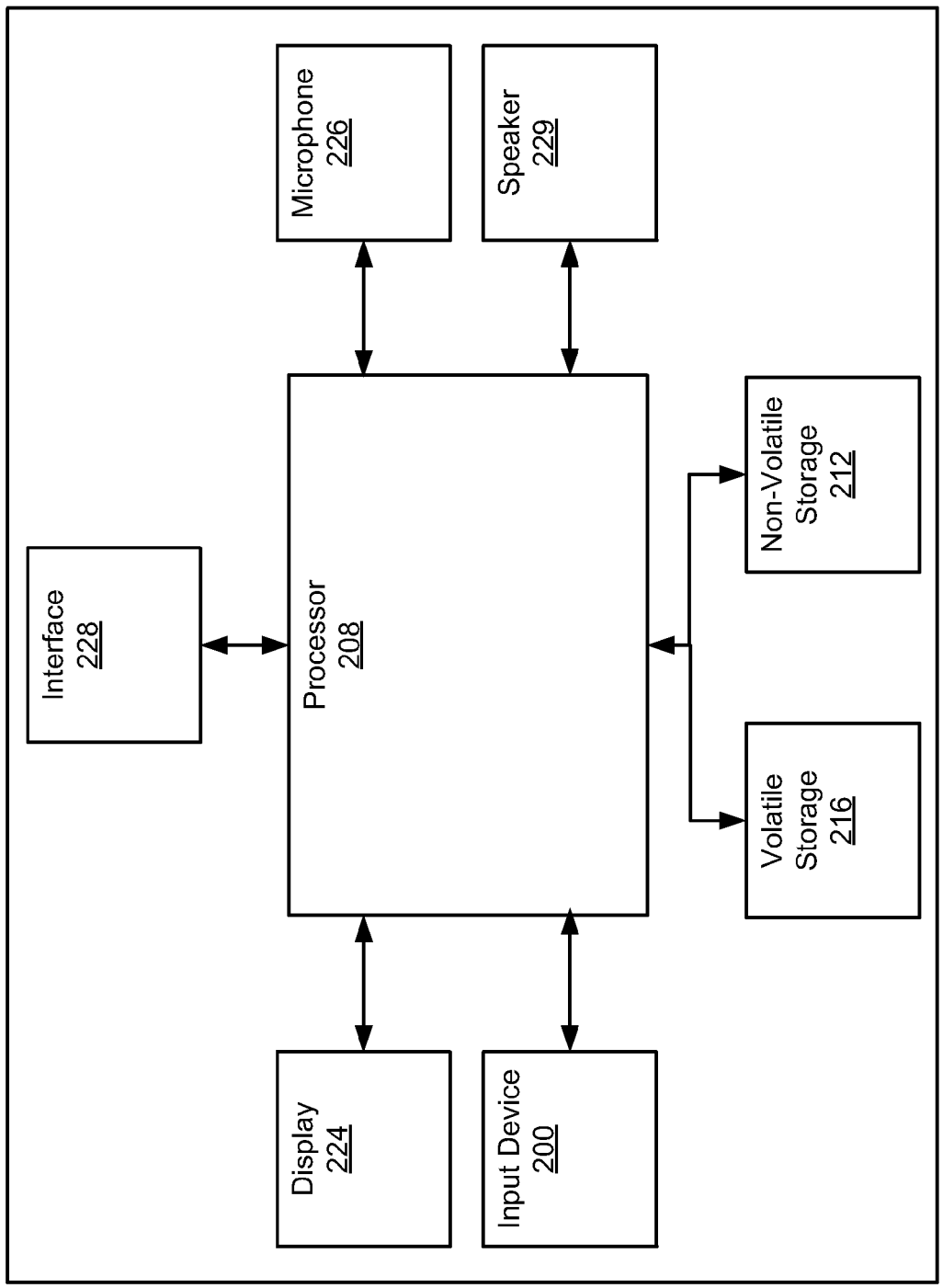
FIG. 2 depicts an apparatus for coordinating answered call status, according to non-limiting implementations.

Attention is directed to FIG. 2, which depicts a schematic diagram of device 103 according to non-limiting implementations. It should be emphasized that the structure in FIG. 2 is purely exemplary, and contemplates a device that can be used for both wireless voice (e.g. telephony) and wireless data communications (e.g. email, web browsing, text, and the like). Device 103 comprises at least one input device 200 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 200 is received at processor 208 (which can be implemented as a plurality of processors). Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of device 103 as described herein are typically maintained, persistently, in non -volatile storage unit 212 and used by processor 208 which makes appropriate utilization of volatile storage 216 during the execution of such programming instructions. Those skilled in the art will now recognize that non-volatile storage unit 212 and volatile storage 216 are examples of computer readable media that can store programming instructions executable on processor 208. Furthermore, non-volatile storage unit 212 and volatile storage 216 are also examples of memory units and/or memory modules.

Processor 208 in turn can also be configured to communicate with a display 224, a microphone 226 and optionally a speaker 229. Display 224 comprises any suitable one of or combination of CRT (cathode ray tube) and/or flat panel displays (e.g. LCD (liquid crystal display), plasma, OLED (organic light emitting diode), capacitive or resistive touchscreens, and the like).

Microphone 226 comprises any suitable microphone for emitting sound data, which can be transmitted to device 103. Speaker 229 comprises any suitable speaker for providing sound data at device 103. It is appreciated that microphone 226 and speaker 229 can be used in combination at device 103 to conduct a voice call, for example with device 101.

In some implementations, input device 200 and display 224 are external to device 103, with processor 208 in communication with each of input device 200 and display 224 via a suitable connection and/or link.

Processor 208 also connects to a network communication interface 228, also referred to hereafter as interface 228, which can be implemented as one or more radios configured to communicate over link 108-1. In general, it will be understood that interface 228 is configured to correspond with the network architecture that is used to implement link 108-1. In other implementations a plurality of links with different protocols can be employed and thus interface 228 can comprise a plurality of interfaces to support each link.

Alerts of calls can be provided at device 103 in any suitable manner. For example, an audible alert can be provided at speaker 229. However in other implementations, a visual alert can be provided at display 224 and/or at a suitable light device (including but not limited to an LED (light emitting diode), not depicted). In yet further implementations device 103 can comprise any other suitable notification device, such as a vibrating motor, which can provide notifications. Indeed, it is appreciated that the method and apparatus for providing alerts of calls at device 103 is not to be considered particularly limiting and any suitable method and apparatus for providing alerts of calls is within the scope of present implementations.

Indeed, it should be understood that in general a wide variety of configurations for device 103 are contemplated.

Figure 3:
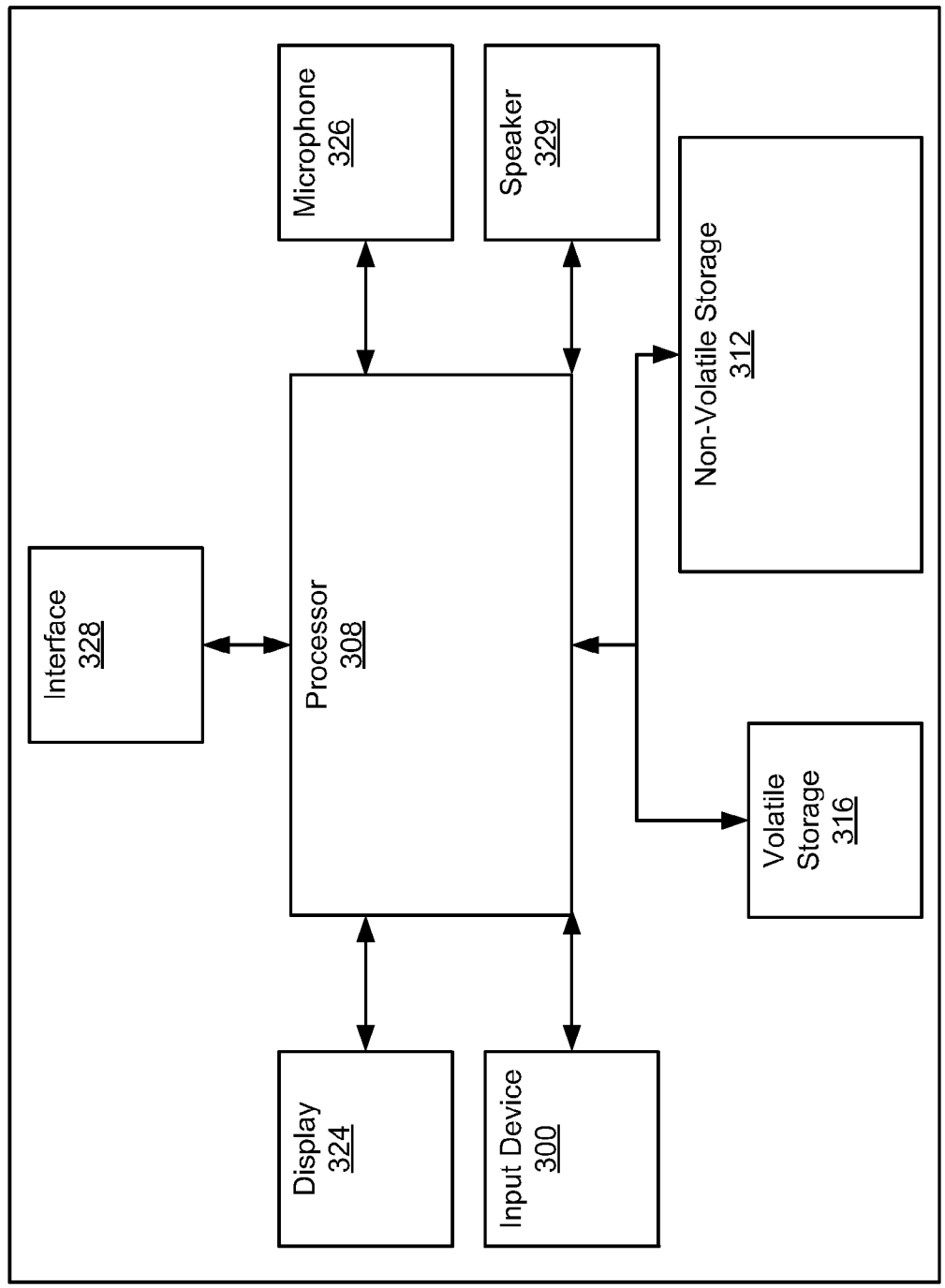
FIG. 3 depicts an apparatus for recording a status of a call as answered, according to non-limiting implementations.

Attention is next directed to FIG. 3, which depicts a schematic diagram of device 105 according to non-limiting implementations. It is appreciated that device 105 can be substantially similar to, or different from, device 103. In any event, FIG. 3 is substantially similar to FIG. 2, with like elements having like numbers, however preceded by a "3" rather than a "2"; for example, processor 308 is substantially similar to processor 208. Specifically, device 105 comprises input device 300, processor 308, non-volatile storage 312, volatile storage 316, display 324, microphone 326, interface 328 and speaker 329.

It is further appreciated that while, in FIG. 1, device 103 is depicted as a mobile communication device and device 105 is depicted as a desktop phone, present implementations are not so limited. Rather, it is appreciated that FIG. 1 is an example only and that each of devices 103, 105 can comprise any suitable communication device as described above.

Figure 4:
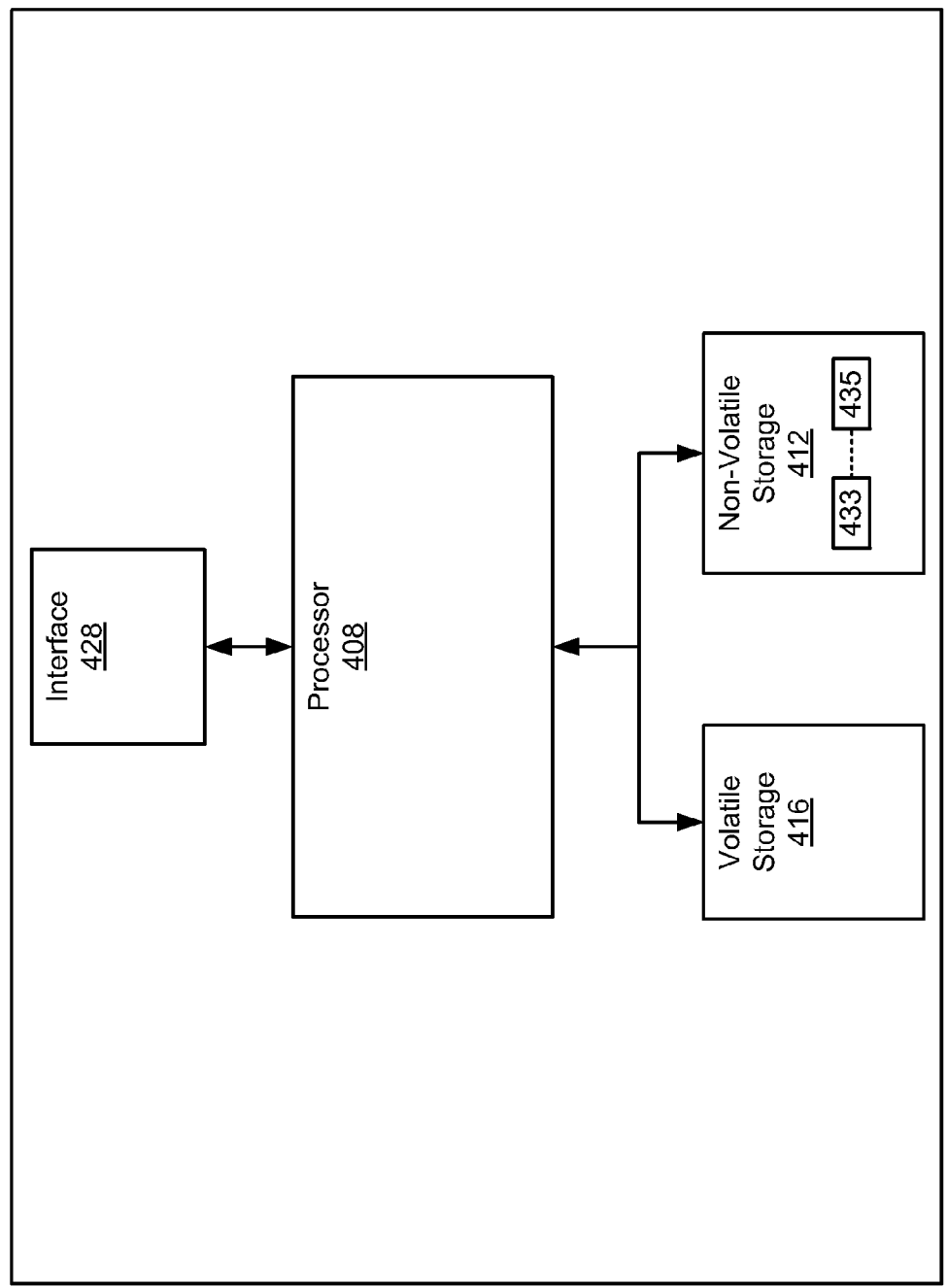
FIG. 4 depicts an apparatus for coordinating answered call status, according to non-limiting implementations.

Attention is next directed to FIG. 4, which depicts a schematic diagram of server 107 according to non-limiting implementations. It is appreciated that elements of server 107 can be substantially similar to, or different from, device 103. In any event, FIG. 4 is substantially similar to FIG. 2, with like elements having like numbers, however preceded by a "4" rather than a "2"; for example, processor 408 is substantially similar to processor 208. Specifically, server 107 comprises processor 408, non-volatile storage 412, volatile storage 416, and interface 428.

It is appreciated that, interface 428 is generally enabled to receive a call from device 101, and processor 408 is generally enabled to fork the call to both device 103 and device 105. For example server 107 can comprise a PBX (private branch exchange) and/or VoIP (Voice over Internet Protocol) server for switching and/or managing calls to devices 103, 105. For example, non-volatile storage 412 can store a relationship between device 103 and device 105, such as a relationship between an identifier 433 of device 103 and an identifier 435 of device 105, as represented by the dotted line there between. Processor 408 then processes the relationship when a call is received for one of devices 103, 105 and causes the call to fork to both devices 103, 105 such that both devices 103, 105 provide an alert of the call, such that the call can be answered at either of devices 103, 105, as described below in further detail with reference to FIG. 5. It is further appreciated that interface 428 can be implemented as one or more interfaces configured to communicate over links 106, 108. In general, it will be understood that interface 428 is configured to correspond with the network architecture that is used to implement links 106, 108. In other implementations a plurality of links with different protocols can be employed and thus interface 428 can comprise a plurality of interfaces to support each link.

For example, devices 103, 105 can each be associated with a given user, one of devices 103, 105 comprising the given user's mobile communication device and the other of devices 103, 105 comprising the given user's desk telephone and/or home telephone. Hence, by forking a call, server 107 enables the call to be answered at either device 103, 105 thereby increasing the possibility that the call will be answered, as the location of the given user is generally unknown.

Server 107 can be based on any well-known server environment including a module that houses one or more central processing units, volatile memory (e.g. random access memory), persistent memory (e.g. hard disk devices) and network interfaces to allow server 107 to communicate over links 106, 108. For example, server 107 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for servers 107 are contemplated. It is further more appreciated that server 107 can comprise any suitable number of servers that can perform different functionality of server implementations described herein. Functionality of server 107 will be described in further detail below.

Figure 5:
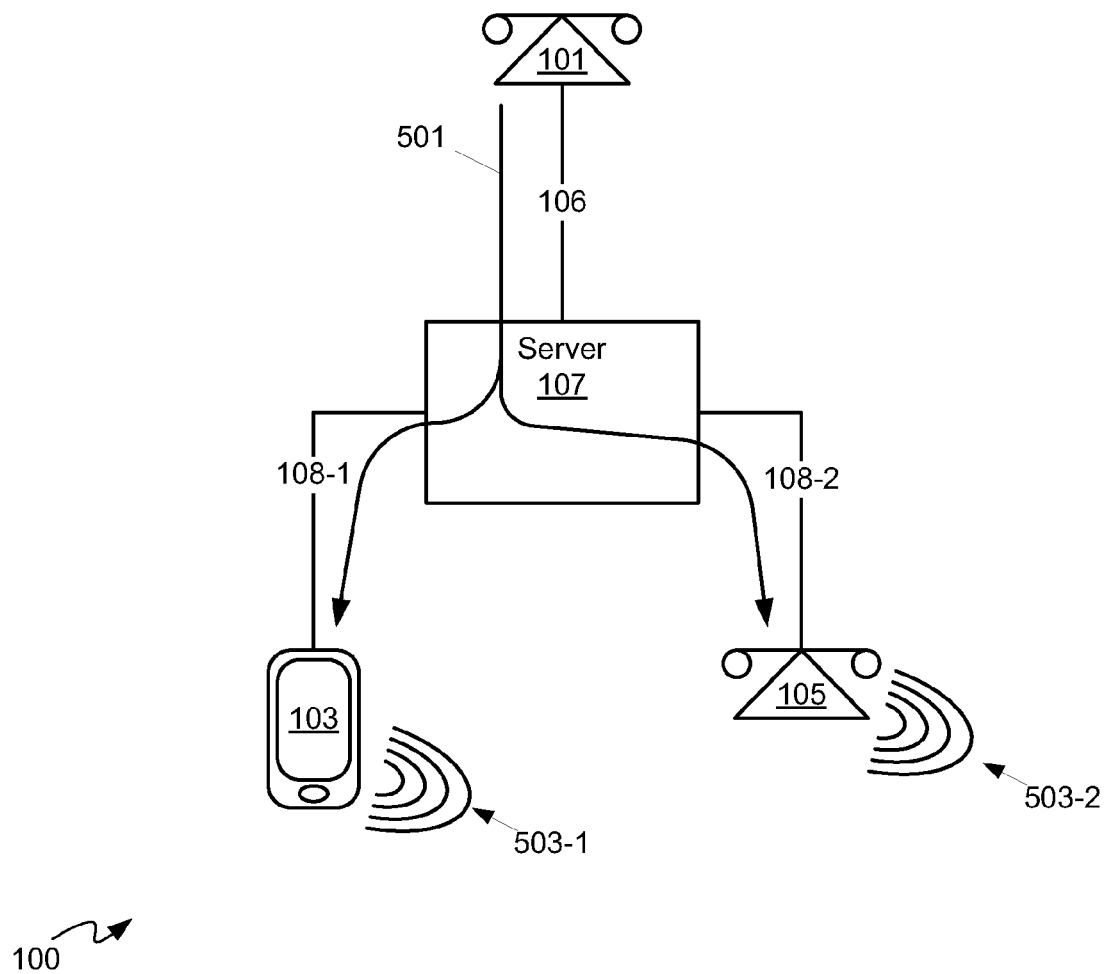
FIG. 5 depicts a forked call in the system of FIG. 1, according to non-limiting implementations.

With reference to FIG. 5, which is substantially similar to FIG. 1, with like elements having like numbers, it is appreciated that device 101 is generally enabled to initiate a call 501, for example voice calls, to devices 103, 105 via server 107, for example by transmitting call initiation data to server 107, call initiation data including, but not limited to, an identifier of one or both of devices 103, 105, a virtual number associated with server 107 (which in turn forwards the call initiation data to devices 103, 105), and the like. In general, device 101 will transmit call initiation data over link 106, which can include a network (not depicted) and network infrastructure, which directs the call initiation data to server 107. Link 106 can include, but is not limited to any suitable combination of switches, servers, the PSTN (public switched telephone network), a VoIP (voice over internet protocol) network, and the like.

Server 107 then causes call 501 to fork such that each of devices 103, 105 provide an alert 503 of a call, which can be accepted or declined (and/or ignored). It is appreciated that the term "alert" is used interchangeably with the term "notification" throughout the present specification.

In some implementations, it is appreciated that link 106 comprises one or more communications devices similar to one or more of devices 101, 103, 105; in these implementations, call 501 can first be received by the one or more communications devices in link 106, which in turn forwards call 501 to server 107 (for example after call 501 is unanswered).

The voice call is established when device 103 accepts the voice call, such that voice data can be exchanged between devices 101, 103. It is appreciated however, that while present implementations are described with reference to voice calls, other types of calls are within the scope of present implementations, for example calls where data is exchanged on the call rather than voice data.

In any event, when the voice call is declined and/or ignored at device 103, the voice call is not established between devices 101, 103. However, it is appreciated that call 501 causes device 103 to provide an alert (e.g. ringing, audible alerts, vibrating, visual alerts and the like) of the voice call, and call 501 further causes device 101 to provide ring tones, for example via a speaker 229, to indicate that device 103 is presently providing an alert/notification of the voice call.

It is further appreciated that links 108-1 and 108-2 can provide communications at different speeds, and hence, in some implementations, device 103 can provide alert 503-1 either prior to call 501 being received at device 105 and prior to device 105 providing alert 503-2. Indeed, in some of these implementations, call 501 can be answered at device 103 before call 501 is received at device 105 and/or before alert 503-2 is provided at device 105, such that alert 503-2 is not provided.

Figure 19:
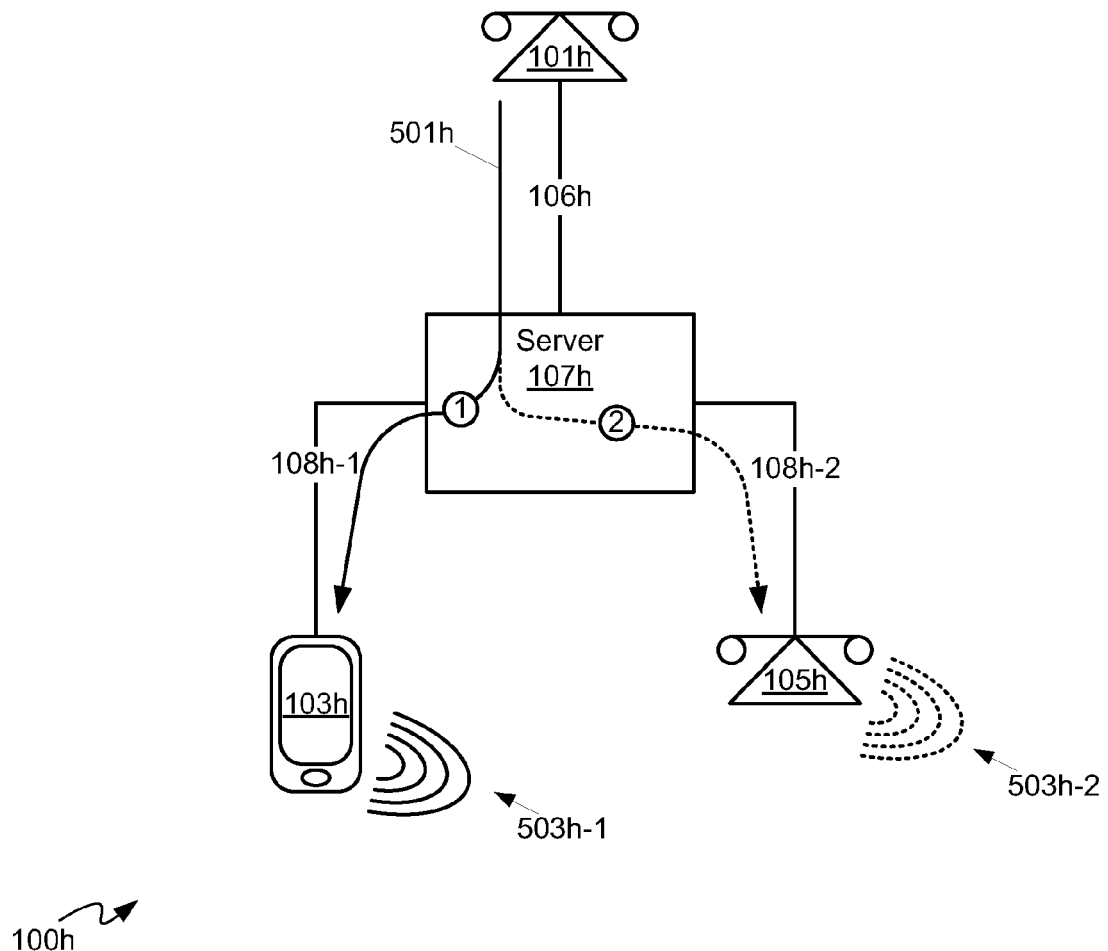
FIG. 19 depicts a system for coordinating answered call status in "follow-me or find-me scenarios", according to non-limiting implementations.

In alternative implementations, calls can be directed to both a first communication device and a second communication device in serial "follow me or find me" scenarios. For example, attention is directed to FIG. 19, which is similar to FIG. 5, with like elements having like numbers, however with an "h" appended thereto. In these implementations, server 107h receives call 501h; however, rather than cause call 501h to fork as in FIG. 5. server 107h first directs call 501h to device 103h (indicated by the label "1" surrounded by a circle in FIG. 19), which provides alert 503h-1. If call 501h is not answered at device 103h, then server 107h then directs call 501h to device 105h (indicated by the label "2" surrounded by a circle in FIG. 19), which provides alert 503h-2, while terminating call 501h at device 103h. The order of devices 103h, 105h to which call 501h is to be directed can be stored at server 107h, for example in a lookup table and the like.

In such scenarios, call initiation data transmitted to server 107h can comprise an identifier of device 105h, such that call 501h is nominally directed to device 105h; while server 107h redirects call 501h to device 103h based on data stored therein. Hence, calls to device 105h can "follow" a user when he/she is not present at device 105h. For example, calls to a user's office phone can be automatically directed to their cell phone, and when the cell phone is not answered, the call is serially redirected to the office phone.

Figure 6:
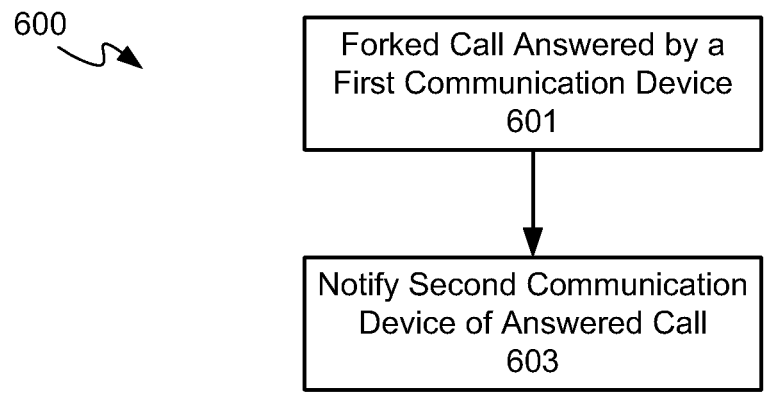
FIG. 6 depicts a method for coordinating answered call status, according to non-limiting implementations.

Attention is now directed to FIG. 6 which depicts a method 600 for coordinating answered call status between associated devices 103, 105, according to non-limiting implementations. In order to assist in the explanation of method 600, it will be assumed that method 600 is performed using system 100. Furthermore, the following discussion of method 600 will lead to a further understanding of system 100 and its various components. However, it is to be understood that system 100 and/or method 600 can be varied, and need not work exactly as discussed herein in conjunction with each other, and that such variations are within the scope of present implementations.

It is appreciated that, in some implementations, method 600 is implemented in system 100 by processor 408 of server 107, respectively. Furthermore, example implementations are presently described with reference to device 103 answering a call forked to devices 103, 105, but it is appreciated that a call forked to devices 103, 105 could be answered by either of devices 103, 105.

At block 601, processor 408 determines that call 501 directed to both device 103 and device 105 was answered at device 103. For example, as described above, server 107 is enabled to direct call 501 to both device 103 and device 105. Hence, server 107 can be further enabled to monitor call 501 to determine which of devices 103, 105 answer call 501. As can be appreciated with reference to both FIGS. 5 and 19, and descriptions above, the direction of calls to both device 103, 105 is independent of whether or not alerts 503 for call 501 are provided at each of devices 103, 105. In other words, call 501 can be directed to both devices 103, 105 in any suitable manner, including but not limited to a parallel forking scenario described with reference to FIG. 5 where call 501 is not received at device 105, and a serial "follow-me or find-me" scenario described with reference to FIG. 19, such that alert 503-2 is not provided at device 105.

At block 603, processor 408 notifies, via communication interface 428, device 105 that call 501 was answered, such that device 105 records a status of call 501 as answered.

Figure 7:
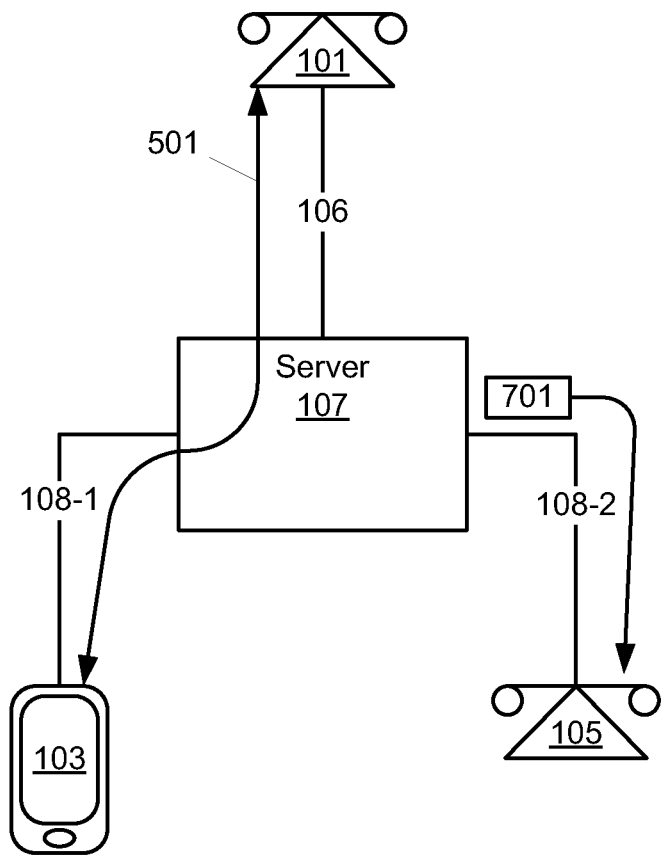
FIG. 7 depicts a connected call in the system of FIG. 1 and notification of call status transmitted to the apparatus that did not take the call, according to non-limiting implementations.

In other words, when a call 501 directed to both device 103 and device 105 was answered at device 103, as determined at block 601, at block 603 processor 408 notifies, via communication interface 428, device 105 that call 501 was answered, such that device 105 records a status of call 501 as answered For example, attention is directed to FIG. 7, which is substantially similar to FIG. 5, with like elements having like numbers. However in FIG. 7, call 501 has been answered at device 103, and server 107 transmits a notification 701 to device 105 that call 501 was answered (hence, in FIG. 7, call 501 is depicted as being between devices 101, 103 with the forking of call 501 removed). Notification 701 can be transmitted when call 501 is answered, after call 501 is answered and/or after call 501 is completed.

Notification 701 generally comprises data indicative that call 501 has been answered. In implementations communications between server 107 and devices 103, 105 can proceed according to SIP (Session Initiation Protocol); in these implementations, notification 501 can comprise a reason code associated with SIP BYE message indicating that call 501 has been answered. Hence, it is appreciated that SIP could be adapted to indicate that a given device has answered a given forked call. In other words, the concept of providing a notification that a call forked to at least two given devices has been answered by at least one of the at least two given devices is new to SIP.

In any event, notification 701 can further comprise metadata associated with call 501, including but not limited to: a length of call 501, a time call 501 was answered, a time call 501 was terminated, an identifier of the device which answered the call (i.e. an identifier of device 103) and/or any other suitable data. It is appreciated that when a portion of such metadata can be dependent on when notification 701 is transmitted; for example, when notification 701 is transmitted before call 501 is completed, notification 701 does not include a length of call 501.

It is further appreciated that, in some implementations, a notification 701 can comprise a first notification that can be transmitted to device 105 before call 501 ends, indicative that call 501 was answered, and a second notification that can be transmitted to device 105 after call 501 ends, comprising further data about the call. Hence, it is appreciated that notification 701 can comprise one or more notifications.

It is appreciated that when call 501 goes unanswered at device 103, in some implementations notification 701 is not transmitted. In other implementations, notification 701 is transmitted but is indicative that call 501 was not answered.

Figure 8:
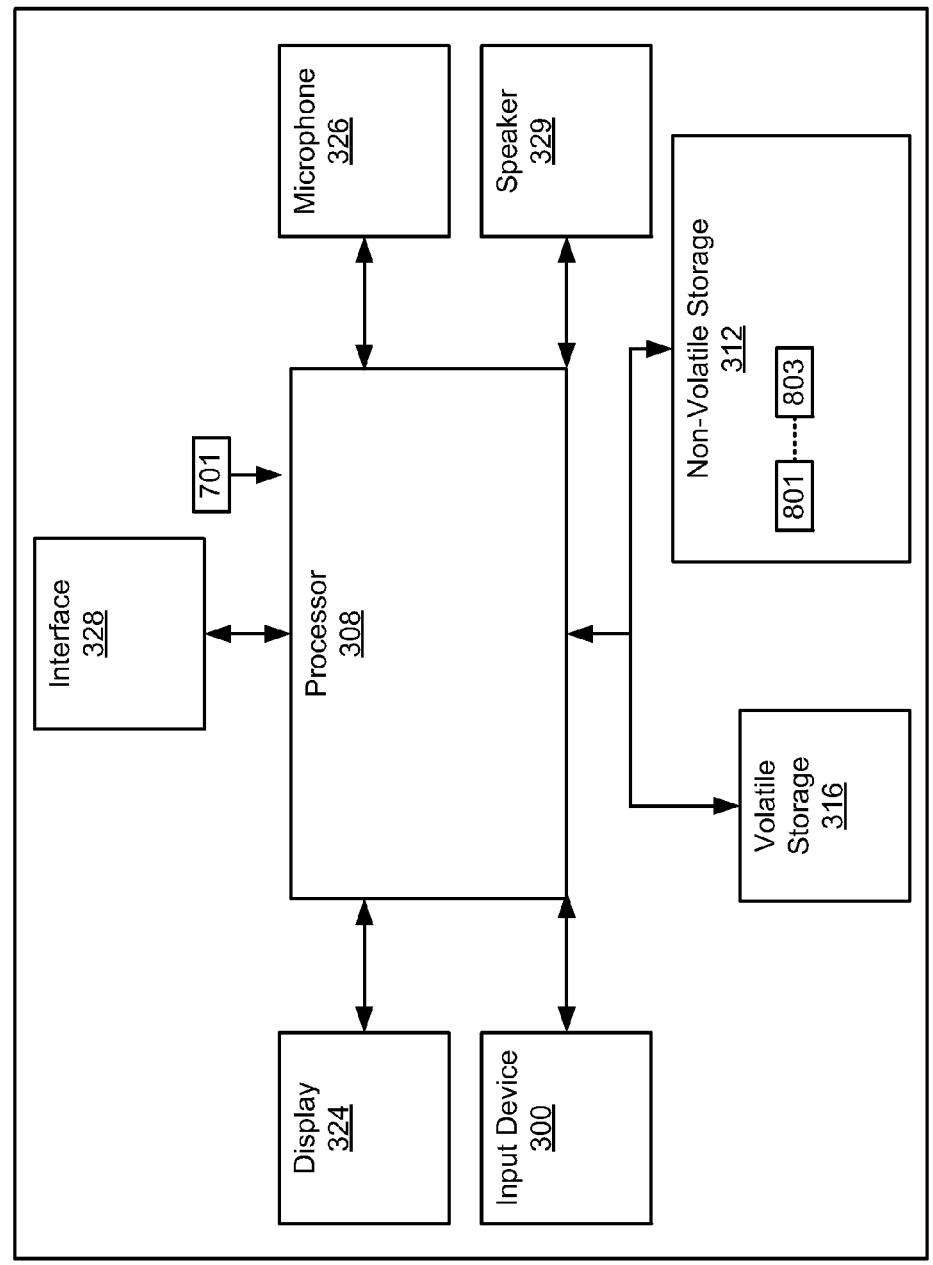
FIG. 8 depicts the apparatus of FIG. 3 receiving the notification of FIG. 7, according to non-limiting implementations.

In any event, attention is next directed to FIG. 8 which is similar to FIG. 3 with like elements having like numbers. However, in FIG. 8, non-volatile storage 312 of device 105 stores a record 801 of call 501, which can include, but is not limited to, an identifier of device 101 (e.g. such as an associated phone number, an associated user name, or the like), an identifier of call 501, a time call 501 was received, or the like. It is appreciated that data stored at record 801 is received at device 105 from server 107 when call 501 is received at device 103. In other words, data stored at record 801 is received when call 501 is received. In any event, once notification 701 is received, data 803 associated with notification 701 is stored in non-volatile storage 312 in association with record 801. In some implementations record 801 comprises data 803, and hence record 801 is updated when notification 701 is received.

In any event, the result is that device 105 records a status of call 501 as answered.

Figure 9:
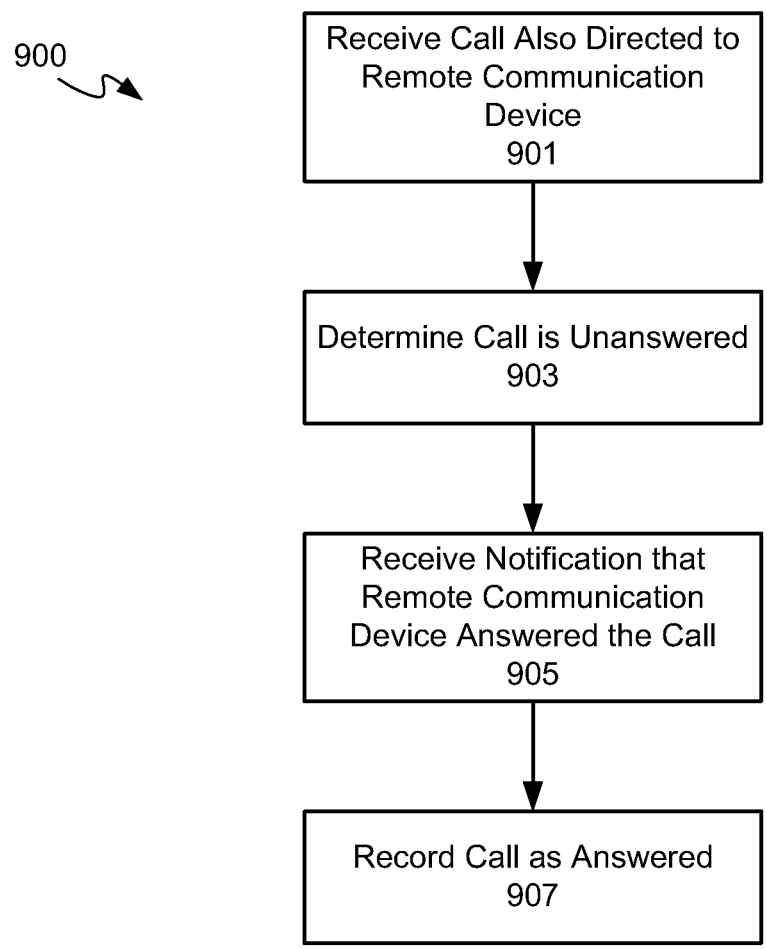
FIG. 9 depicts a method for recording a status of a call as answered, according to non-limiting implementations.

For example, attention is next directed to FIG. 9 which depicts a method 900 for recording a status of a call as answered at a device where the call was unanswered, according to non-limiting implementations. In order to assist in the explanation of method 900, it will be assumed that method 900 is performed using system 100. Furthermore, the following discussion of method 900 will lead to a further understanding of system 100 and its various components. However, it is to be understood that system 100 and/or method 900 can be varied, and need not work exactly as discussed herein in conjunction with each other, and that such variations are within the scope of present implementations.

It is appreciated that method 900 is implemented by processor 308 of device 105.

At block 901, processor 308 receives, via communication interface 328, call 501 that is also directed to a remote communication device, such as device 103.

At block 903, processor 308 determines that call 501 is unanswered. For example, call 501 ends without being answered at device 105, and processor 408 determines that call 501 has ended without being answered.

At block 905, processor 308 receives notification 701, via communication interface 328, that the remote communication device answered call 501, as described above.

Figure 10:
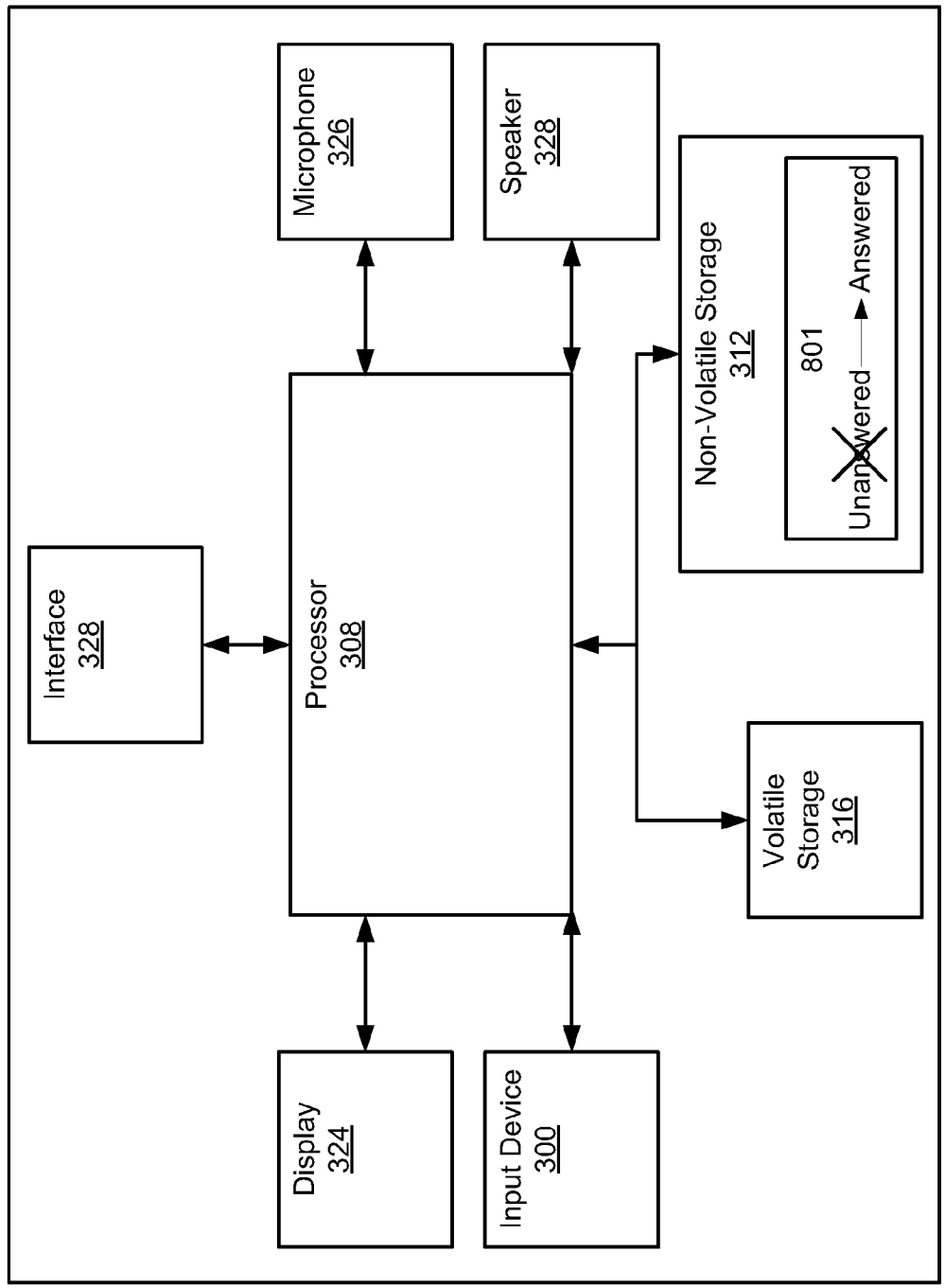
FIG. 10 depicts the apparatus of FIG. 3 changing a status of a call from unanswered to answered, according to non-limiting implementations.

At block 907, processor 308 records a status of call 501 as answered, for example by storing data 803 in association with record 801 at non-volatile storage 312. It is appreciated that, in some implementations, the status of call 501 can first be recorded as unanswered, and the status of call 501 is changed from unanswered to answered after receiving notification 701. For example, attention is directed to FIG. 10, which is similar to FIG. 8, with like elements having like numbers, however record 801 is expanded with data that was earlier described with reference to data 803 stored in record 801; hence data 803 is not depicted in FIG. 10. In any event, in these implementations, call 501 is initially recorded at record 801 as "Unanswered", but after notification 701 is received, the status of call 501 changes to "Answered" at record 801.

However, in other implementations, the status of call 501 is recorded as answered regardless of whether call 501 was received at device 105 and/or whether alert 503-2 was provided. For example, the status of call 501 can be recorded as answered in the serial scenario described with reference to FIG. 19 and/or in parallel forking scenarios where alert 503-2 is not provided due to call 501 being answered at device 103 before call 501 is received at device 105. In these implementations, a status of call 501 is recorded at device 105 regardless of whether call 501 was received at device 105.

In implementations where a first notification is received at device 105 before call 501 ends, indicative that call 501 was answered, and a second notification is received at device 105 after call 501 ends, comprising further data about the call, record 801 and/or data 803 can be updated as each notification is received.

Attention is next directed to FIGS. 11A-11F, each of which depicts respective messages 1111A-1111F (generically a message 1111, and collectively messages 1111) rendered at display 324 of device 105 by processor 308, each message 1111 indicative of a status of call 501. For example, FIG. 11A depicts message 1111A indicating that call 501 was unanswered, along with metadata received with call 501, such as an identifier of call 501 ("415-555-1212"), a date of call 501 ("Oct. 31, 2011"), and a time of call 501 ("12:38"). Message 1111A also indicates that call 501 was unanswered. It is appreciated that while message 1111A is similar to conventional approaches, message 1111A can also be rendered before notification 701 is received.

In contrast to message 1111A, FIG. 11B depicts a message 1111B rendered once notification 701 is received. In contrast to message 1111A, message 1111B indicates that call 501 was answered, even though call 501 was not answered by device 105. In other words, the status of call 501 is recorded, and rendered in message 1111B, as answered, even though call 501 was answered by device 103.

Message 1111C is similar to message 1111B, however message 1111C indicates that device 103 (i.e. "Your Mobile Device") answered call 501.

It is appreciated that either of messages 1111B and 1111C can be rendered prior to call 501 ending at device 103. It is appreciated that, in these implementations, notification 501 can be received before call 501 ends or after call 501 ends.

In contrast messages 1111D, 1111E, 1111F can be rendered after call 501 has ended, as each of messages 1111D, 1111E, 1111F comprise data indicative of a length of call 501. For example, message 1111D is indicative of when call 501 ended ("Call Ended at 1:02"), message 1111E is indicative of a length of call 501 ("Call Length 24 Minutes"), and message 1111F is similar to message 1111E, but is further indicative that device answered call 501, similar to message 1111C.

It is appreciated that the information rendered in each message 1111 is generally non-limiting, however each message 1111B-1111F is indicative that call 501 was answered, while message 1111A is indicative that call 501 was unanswered; indeed, each message 1111 is indicative of data stored in non-volatile storage 312, at record 801 and/or at data 803.

It is further appreciated that message 1111B-1111F is indicative that call 501 was answered regardless of whether call 501 was received at device 105.

It is further appreciated that method 600 can alternatively be implemented at device 103, and that any suitable variation of method 600 is within the scope of present implementations. Furthermore, method 600 can be a push or pull process as will presently be explained.

Figure 12:
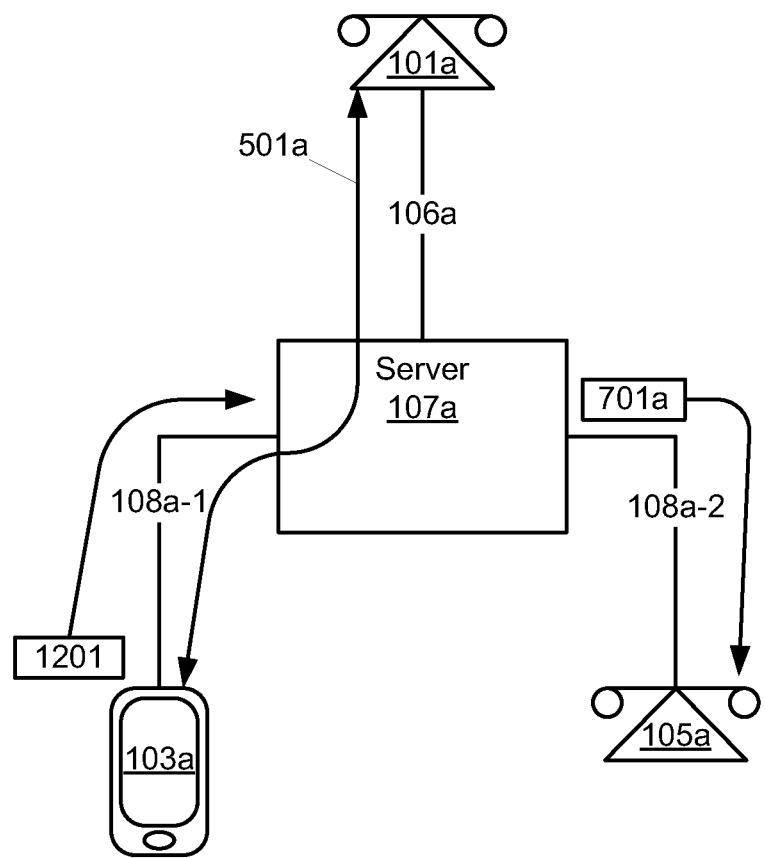
FIGS. 12-18 depict systems for coordinating answered call status, according to non-limiting implementations.
Figure 12:

For example, attention is now directed to FIG. 12, which is similar to FIG. 7, with like elements having like numbers, however with an "a" appended thereto. However, in these implementations, notification 701a is transmitted from server 107a upon receipt of call status data 1201 from device 103, call status data 1201 indicative that call 501a was answered and, alternatively further data associated with call 501, such as length of call 501a, and the like. In these implementations, method 600 is implemented at server 107a.

Figure 13:
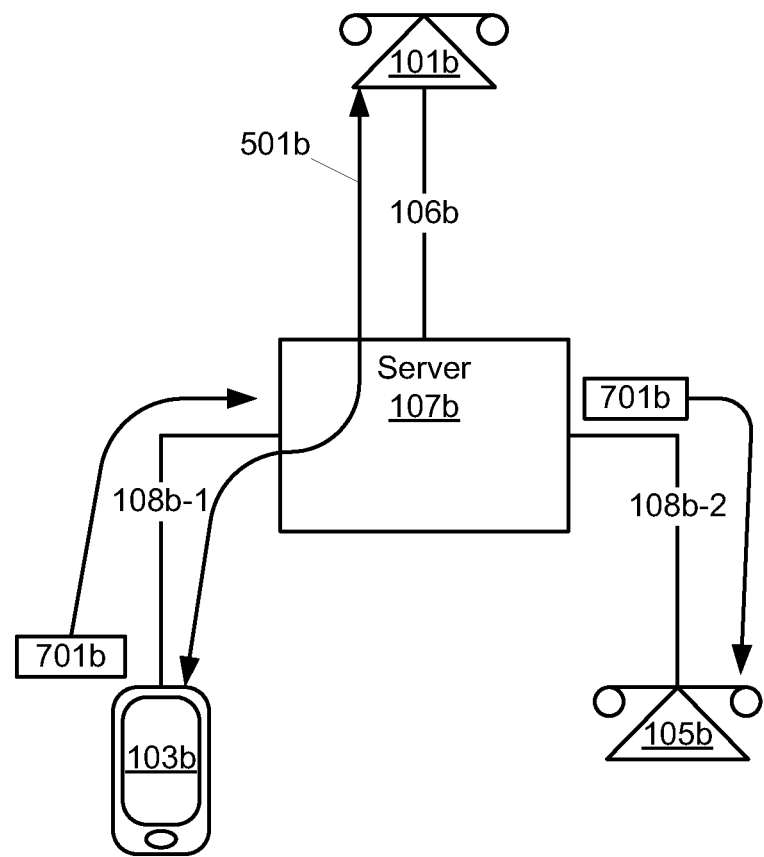

Attention is next directed to FIG. 13, which is similar to FIG. 12, with like elements having like numbers, however with a "b" appended thereto. However, in these implementations, method 600 is implemented at a processor of device 103b, and notification 701b is transmitted by device 103b to device 105b via server 107b. It is appreciated that, in these implementations, device 103b is enabled to determine when call 501b has been answered by itself, and in response transmit notification 701b to server 107b, which in turn transmits notification 701b to device 105b. In some implementations, server 107b can process notification 701b prior to transmitting to device 105b to store a record of notification 701b. It is further appreciated that, in further implementations, notification 701b can be modified by server 107b prior to transmission to device 105b, for example to add additional data regarding call 501b. It is yet further appreciated that device 103b may not be provisioned with an identifier of device 105b; however, server 107b is enabled to forward notification 701b received from device 103b to all devices with which device 103b is paired. It is also appreciated that in some implementations server 107b stores call data and associated notification data (e.g. similar to call data 801 and data 803, respectively), while in other implementations server 107b can be stateless and may not store call data and/or associated notification data.

Figure 14:
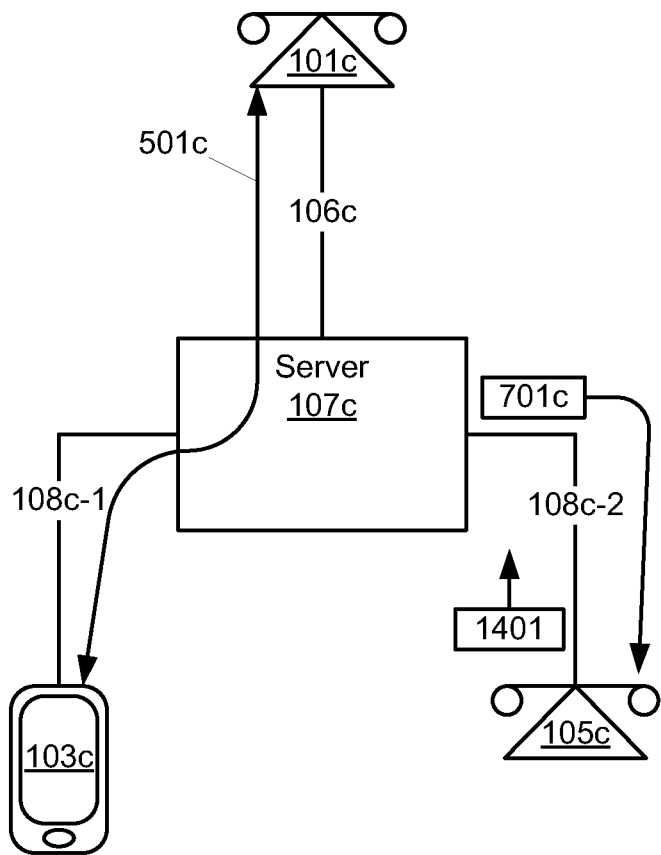

Attention is next directed to FIG. 14, which is similar to FIG. 12, with like elements having like numbers, however with a "c" appended thereto. In these implementations, method 600 is implemented at server 107c, however server 107c is enabled to transmit notification 701c to device 105c in response to receipt of a call status request 1401 received from device 105c. For example, device 105c can be enabled to transmit call status request 1401 upon determination that call 501c is unanswered at device 105c, in order to determine a status of call 501c. In other words, once call 501c goes unanswered at device 105c, device 105c is enabled to determine a status of call 501c by transmitting call status request 1401. It is appreciated that device 105c may delay transmitting call status request 1401 for one or more of a given fixed time after call 501c goes unanswered at device 105, when call status is needed (e.g., in preparation for displaying a call history, call log, and the like) and the like.

It is appreciated that, in some implementations call 501c can be unanswered at device 103c. In some of these implementations, when call 501c is unanswered at device 103c, notification 701c is not transmitted and the status of call 501c can remain as unanswered at device 105c. However, in other implementations, notification 701c is transmitted, but is indicative that call 501c is unanswered at device 103c.

Figure 15:
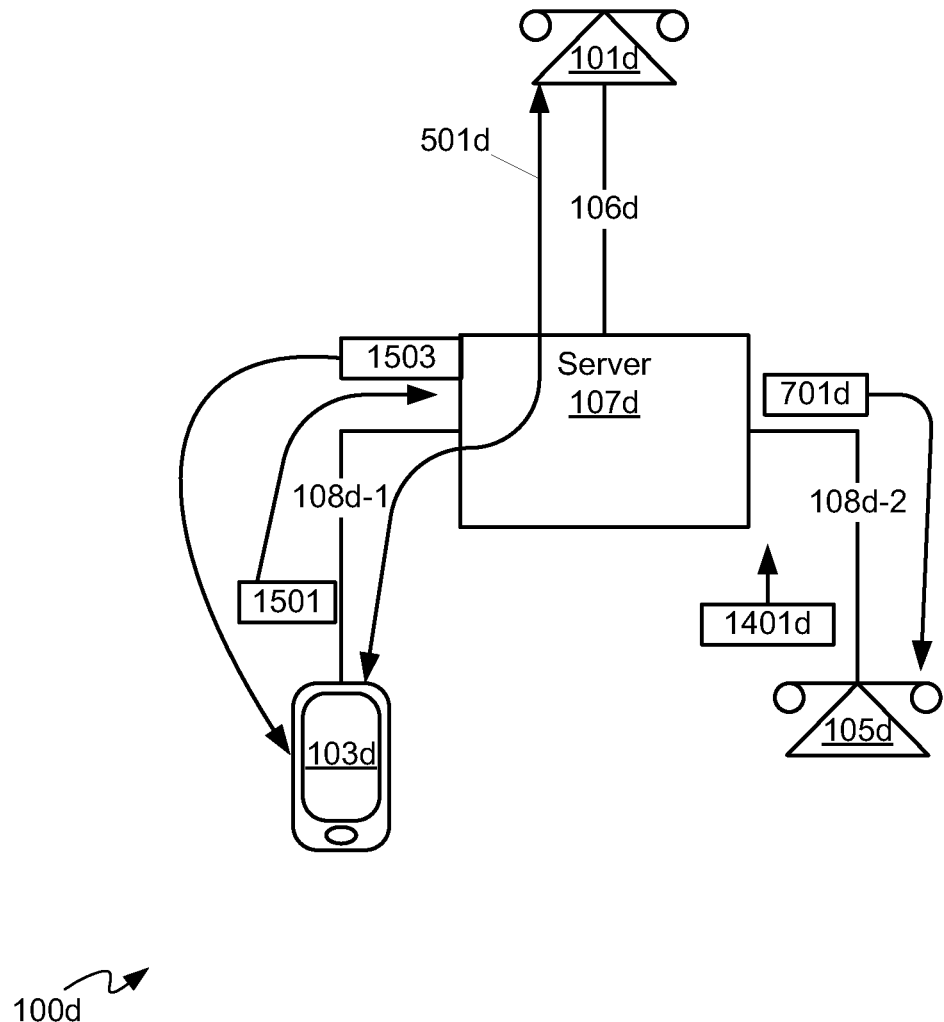

Attention is next directed to FIG. 15, which is similar to FIG. 14, with like elements having like numbers, however with a "d" appended thereto. In these implementations, method 600 is implemented at server 107d, however server 107d is enabled to transmit notification 701d to device 105d in response to receipt of a call status request 1401d received from device 105d. Upon receipt, server 107d requests call status data 1501, similar to call status data 1201, from device 103d, via transmission of a call status request 1503 to device 103d.

Figure 16:
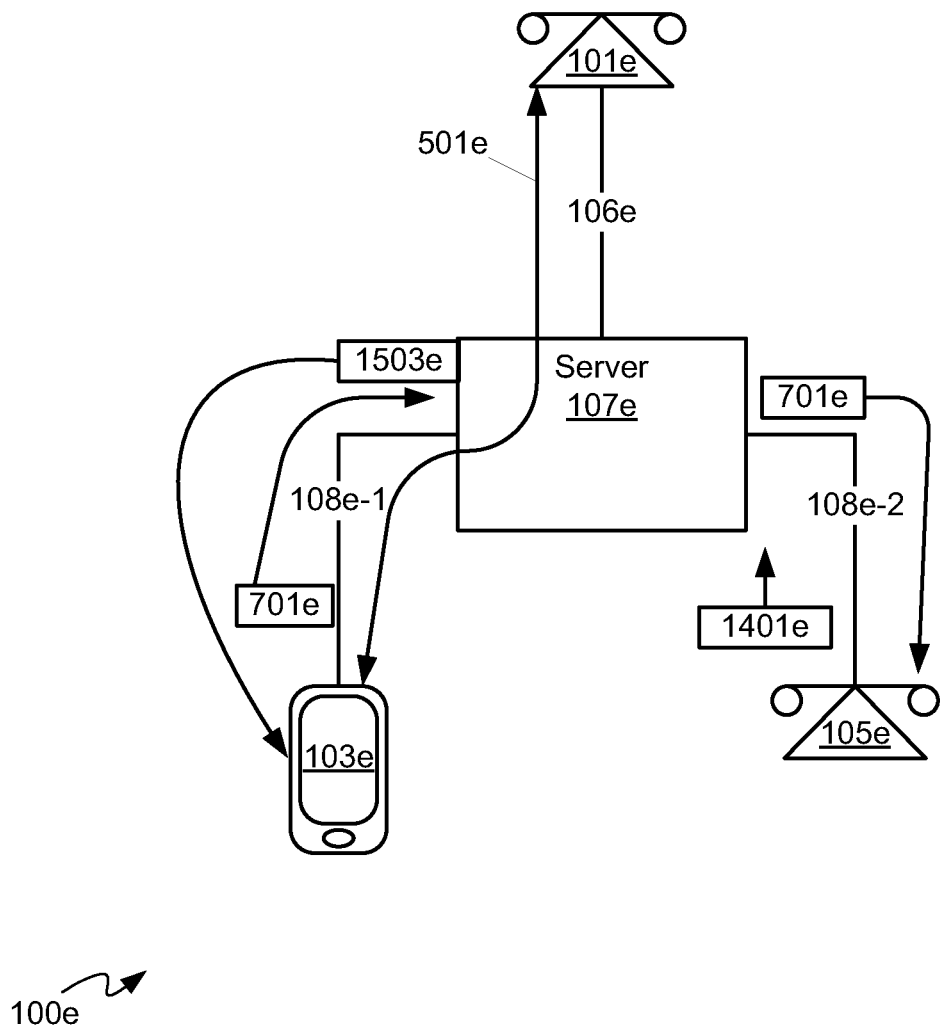

Attention is next directed to FIG. 16, which is similar to FIG. 15, with like elements having like numbers, however with an "e" appended thereto. In these implementations, method 600 is implemented at device 103e, notification 701e is transmitted in response to receipt of call status request 1503e from server 107e, which is in turn transmitted in response to receiving call status request 1401e at server 107e from device 105e.

Figure 17:
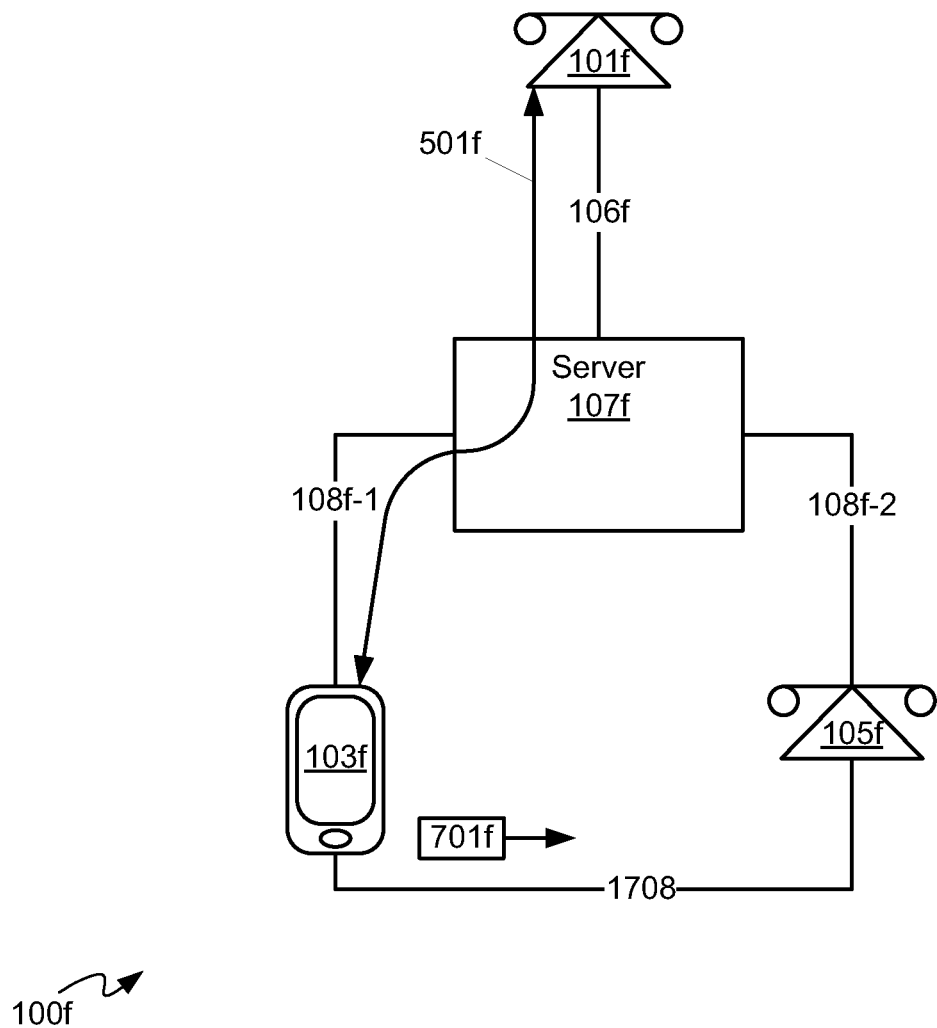

Attention is next directed to FIG. 17, which is similar to FIG. 13, with like elements having like numbers, however with an "f" appended thereto. In these implementations, devices 103f, 105f are in communication via link 1708. In other words, in system 100f, devices 103f, 105f are enabled to communicate with one another via link 1708 rather than via server 107f. For example, links 106f, 108f can comprise call communication links for connecting voice calls and the like, while link 1708 can comprise a data link for transmitting data, including but not limited to message data, e-mail data, chat data, SMS (short message service) data, MMS (multimedia message service) data and the like. Link 1708 can comprise any suitable combination of wired and wireless links and/or any suitable combination of wired and wireless communication networks as desired.

In any event, in system 100f, method 600 is implemented at device 103f, and device 103f is enabled to transmit notification 701f to device 105f via link 1708 when device 103f determines that call 501f has been answered by itself. It is appreciated that, in these implementations, device 103f has been provisioned with an identifier of device 105f which enabled notification 701f to be transmitted to device 105f. Hence, in system 100f, a processor at device 103f is enabled to transmit a notification 701f of call status via a communication link 1708 different from a call communication link 108f-1, notification 701f transmitted to device 105f, wherein call 501f is received via call communication link 108f. In other words, in system 100f, call 501f is received on a first link 108f-1 via server 107f, while notification 701f that call 501f has been answered is transmitted on a second link 1708.

Figure 18:
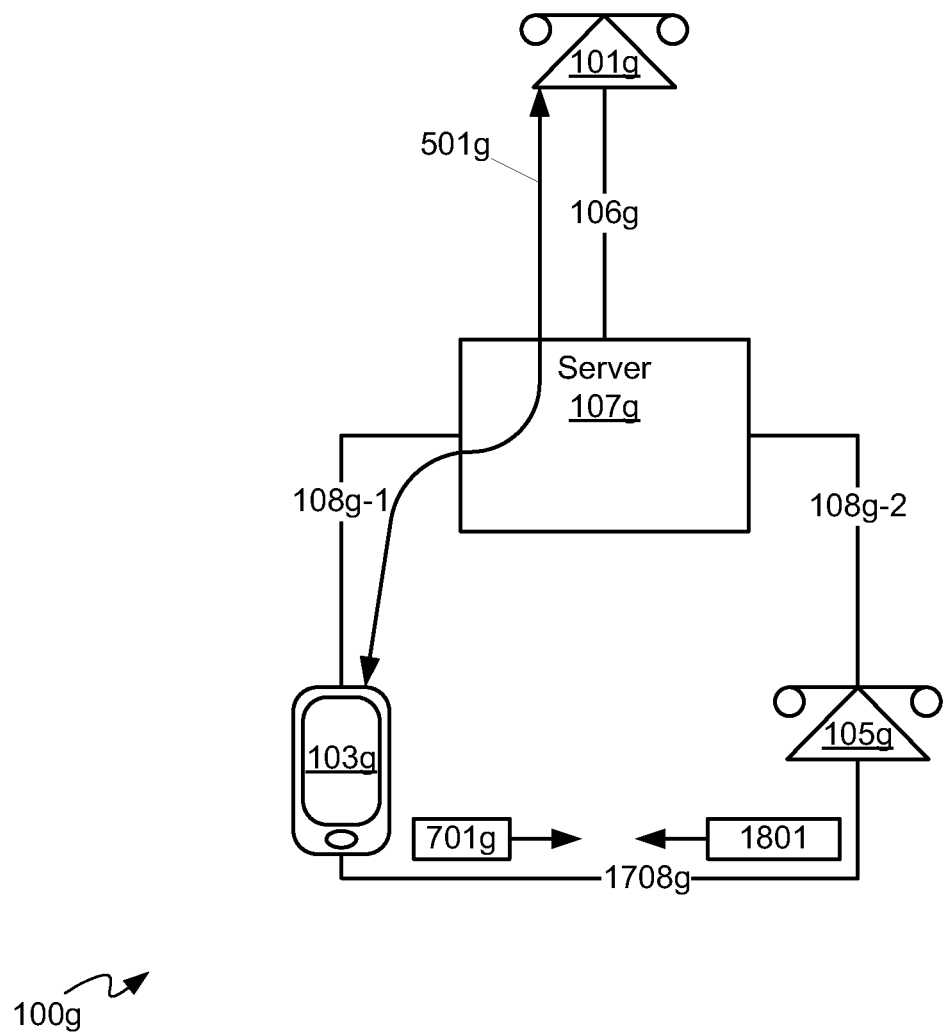

Attention is next directed to FIG. 18, which is similar to FIG. 17, with like elements having like numbers, however with a "g" appended thereto. However, in system 100g, device 105g transmits a call status request 1801 to device 103g via link 1708g, similar to call status request 1401. Hence, device 105g is provisioned with an identifier of device 103g. In any event, method 600 is implemented at device 103g once call status request 1801 is received from device 105g.

It is appreciated that each of systems 100f, 100g comprise systems where out-of-band messages are used to provided notifications 701f, 701g, and specifically out of band from calls 501f, 501g.

Furthermore, it is appreciated that in systems 100, 100a, 100b, 100f respective notifications 701, 701a, 701b, 701f are pushed to respective devices 105, 105a, 105b, 105f; while in systems 100c, 100d, 100e, 100g, notifications 701c, 701d, 701e, 701g are pulled from respective devices 103c, 103d, 103e, 103g by respective devices 105c, 105d, 105e, 105g.

In any event, by providing call status notifications to a communication device where an unanswered call was picked up at another communication device, a more accurate record of the call can me maintained at the communication device.

Those skilled in the art will appreciate that in some implementations, the functionality of devices 103-103g, devices 105-105g, and servers 107-107g can be implemented using pre-programmed hardware or firmware elements (e.g., application specific integrated circuits (ASICs), electrically erasable programmable read-only memories (EEPROMs), etc.), or other related components. In other implementations, the functionality of devices 103-103g, devices 105-105g, and servers 107-107g can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. An apparatus comprising:
  a processor coupled to a communication interface, the processor enabled to:
    when a call directed to both a first communication device and a second communication device was answered at the first communication device and not answered at the second communication device:
    notify, via the communication interface, the second communication device that the call was answered, such that the second communication device changes a status of the call from unanswered to answered at a memory of the second communication device.

2. The apparatus of claim 1, further comprising a server enabled to direct the call to both the first communication device and the second communication device, the server comprising the processor and the communication interface.

3. The apparatus of claim 2, wherein the processor is further enabled to determine that the call was answered at the first communication device by one or more of:
  monitoring the call; and,
  receiving call status data from the first communication device, the call status data indicative that the call was answered.

4. The apparatus of claim 2, wherein the processor is further enabled to request call status data from the first communication device in response to receipt of a call status request by the second communication device.

5. The apparatus of claim 1, wherein the processor is further enabled to notify the second communication device that the call was answered at the first communication device in response to receipt of a call status request by the second communication device.

6. The apparatus of claim 1, wherein the apparatus comprises the first communication device, the first communication device comprising the processor and the communication interface.

7. The apparatus of claim 6, wherein the processor is further enabled to transmit a notification of call status to the second communication device via a communication link different from a call communication link, wherein the call is received via the call communication link.

8. The apparatus of claim 7, wherein the processor is further enabled to notify the second communication device that the call was answered in response to receipt of a call status request sent by the second communication device.

9. The apparatus of claim 1, wherein the second communication device is notified that the call was answered regardless of whether the call was received at the second communication device.

10. An method comprising,
  when a call directed to both a first communication device and a second communication device was answered at the first communication device and not answered at the second communication device:
  notifying the second communication device that the call was answered, such that the second communication device changes a status of the call from unanswered to answered at a memory of the second communication device.

11. The method of claim 10, wherein the method occurs at one or more of a server and the first communication device.

12. The method of claim 10, further comprising determining that the call was answered at the first communication device by one or more of:
  monitoring the call at a server; and,
  receiving call status data at the server from the first communication device, the call status data indicative that the call was answered.

13. The method of claim 12, further comprising the server requesting call status data from the first communication device in response to receipt of a call status request from the second communication device.

14. The method of claim 10, wherein the notifying the second communication device that the call was answered at the first communication device occurs in response to receipt of a call status request sent by the second communication device.

15. The method of claim 10, wherein a notification of call status is transmitted to the second communication device via a communication link different from a call communication link, wherein the call is received via the call communication link.

16. The method of claim 10, wherein the second communication device is notified that the call was answered regardless of whether the call was received at the second communication device.

17. An non-transitory computer medium having a computer readable program code adapted to be executed to implement a method comprising:
   when a call directed to both a first communication device and a second communication device was answered at the first communication device and not answered at the second communication device:
   notifying the second communication device that the call was answered, such that the second communication device changes a status of the call from unanswered to answered at a memory of the second communication device.

18. An communication device comprising:
   a processor coupled to a communication interface and a memory, the processor enabled to:
   receive, via the communication interface, a call that is also directed to a remote communication device, the call not answered at the communication device;
   determine that the call is unanswered at the communication device;
   receive a notification, via the communication interface, that the remote communication device answered the call; and,
   change a status of the call as from unanswered to answered at the memory.

19. The communication device of claim 18, wherein the notification is received in response to requesting the status of the call from at least one of the remote communication device and a server associated with the call.

20. An method comprising:
   receiving, at a processor of a communication device, via a communication interface of the communication device, a call that is also directed to a remote communication device, the call not answered at the communication device;
   determining, at the processor, that the call is unanswered at the communication device;
   receiving a notification, via the communication interface, that the remote communication device answered the call; and,
   changing, via the processor, a status of the call from unanswered to answered at a memory of the communication device.

* * * * *